2,860,320

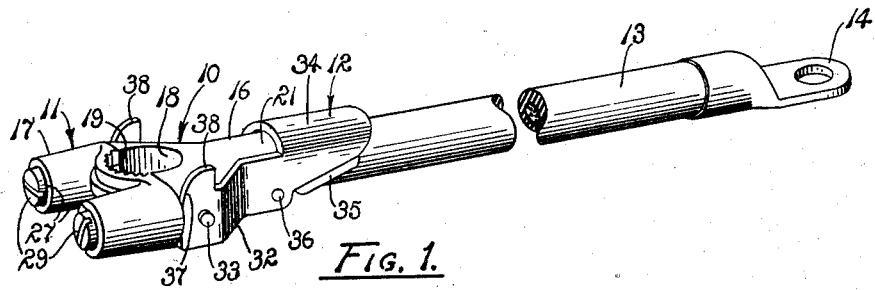
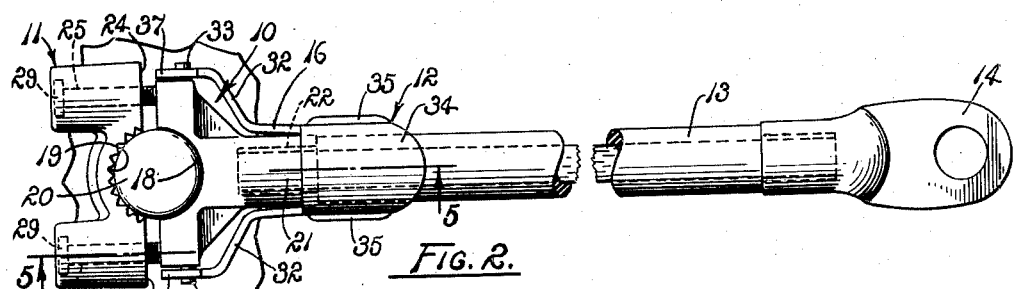
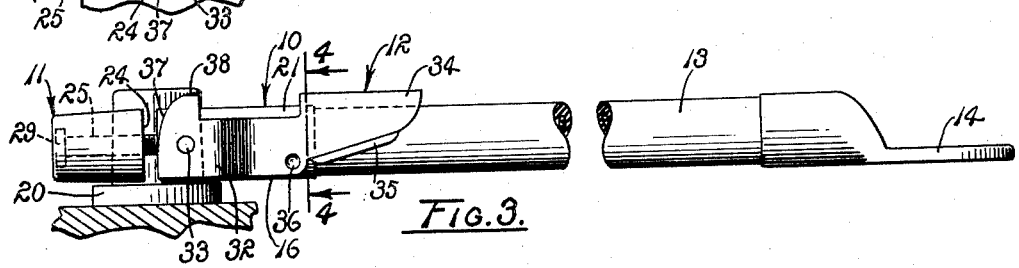
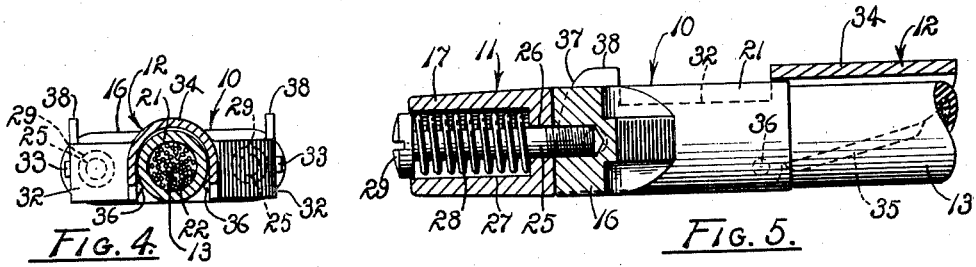
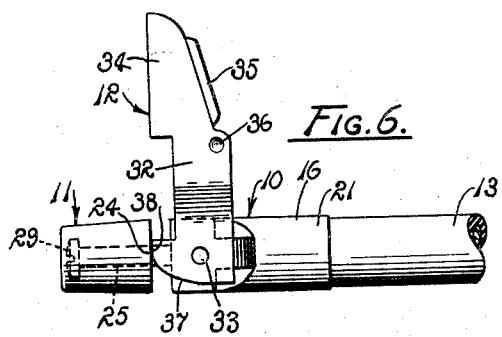
AUSTIN G. GOODNIGHT
INVENTOR
HUEBNER BEEHLER
WORREL & HERZIG
ATTORNEYS United States Patent Office 2,860,320
Patented Nov. 11, 1958

BATTERY CONNECTOR

Austin G. Goodnight, Clovis, Calif., assignor of one-third to Frank D. Cabe and one-third to Marshall U. Boyer, Fresno, Calif.

Substituted for abandoned application Serial No. 264,567, January 2, 1952. This application May 5, 1955, Serial No. 506,297

2 Claims. (Cl. 339—239)

The present invention relates to battery connectors and more particularly to an improvement in the battery connectors shown and described in my United States Patent No. 2,548,782, issued April 10, 1951.

In automotive vehicles it is the usual practice to employ storage batteries for the purpose of accumulating and holding electrical charges for use in operating such vehicles' many electrical devices, such as starters, lights, signals, radios, lighters, and the like. It frequently becomes necessary to remove such storage batteries for charging, replacement, or reversing. The problems incident to the disconnection of the batteries are well known. The connectors frequently become corroded so as to be removable only with great difficulty or by actual destruction thereof. During operation, conventional connectors frequently become loosened by vibration or rendered less efficient by corrosion so that their electrical conducting properties are inadequate for the sudden surges of electrical energy required of storage batteries.

The time and labor required to connect and disconnect storage batteries are encountered in aggravated form in the operation of diesel engines in which it is the usual custom to reverse the batteries periodically during use. Not only do the starting load requirements of diesel engines require a good source of electrical energy and dependable connection thereto, but the frequent manipulation of the battery connectors in the battery-reversing operations subjects the connectors to such frequent loosening and tightening adjustments as to make the use of conventional battery connectors quite undesirable. Although the battery connectors shown and described in the above identified United States patent substantially overcame the difficulties incident to the employment of conventional connectors, certain improvements made therein have attained additional advantages.

An object of the present invention is to provide an improved battery connector.

Another object is to provide a battery connector which can be quickly and easily connected and disconnected from storage batteries without the use of auxiliary tools of any kind as an aid thereto.

Another object is to provide a battery connector which when mounted on a battery post is continually constricted thereagainst and achieves even increased electrical connection to the post when subjected to vibration and wear.

Another object is to reduce the time and labor required to remove storage batteries from automotive vehicles and other operational environments to substantially that required to lift such batteries from their operating positions.

Another object is to provide a battery connector having a pair of associated elements defining a battery post receiving opening therebetween, means slidably interconnecting the elements for relative spacial adjustment, and resilient means urging the elements toward each other in which the slidable interconnecting means and the resilient means are housed within one of the elements to shield the same from damage.

Further objects and advantages will become apparent in the subsequent description in the specification.

In the drawing:

Fig. 1 is a perspective view of a battery connector embodying the principles of the present invention.

Fig. 2 is a somewhat enlarged plan view of the connector shown in Fig. 1 illustrated in association with a fragmentarily represented battery providing a battery post.

Fig. 3 is a side elevation of the structure shown in Fig. 2.

Fig. 4 is a transverse section of the battery connector taken on line 4—4 of Fig. 3.

Fig. 5 is an enlarged fragmentary section of the battery connector taken on line 5—5 of Fig. 2.

Fig. 6 is a fragmentary side elevation of the battery connector in battery post releasing condition.

Referring in greater detail to the drawing:

A battery connector embodying the principles of the present invention is indicated generally at 10 having a clamping member 11 and an operating lever 12 pivotally connected thereto. A battery cable 13 is connected to the clamping member and provides a lug 14 soldered or otherwise affixed thereto.

The connector 10 includes a base element 16 and a cap element 17. The elements provide semi-circular inner ends 18 and 19, respectively, adapted to embrace a battery post 20. The inner end 19 of the base element is preferably substantially smooth and the inner end 18 of the cap element provided with elongated teeth adapted to engage longitudinally against the battery post. Of course, the teeth may be provided on both elements, on neither element, or on either element without departing from the spirit or scope of the invention.

The base element 16 is provided with a substantially cylindrical shank 21 integral therewith having an axial bore 22 into which the cable 13 is extended and secured, as by soldering.

It will be noted that the base element 16 is somewhat narrower than the cap element 17 so that the cap element provides a pair of shoulders 24 at opposite sides of the base element and disposed theretoward. A pair of substantially parallel guide rods 25 are rigidly mounted in the base element and extended therefrom on opposite sides of the battery post receiving opening. The cap element 17 is provided with a pair of spaced bores 26 which slidably receive the guide rods 25. A counterbore 27 is formed inwardly from the outer end of the cap element concentrically of each of the bores 26. A helical compression spring 28 is mounted concentrically on each of the guide rods 25 in the counterbores 27 and a head 29 provided on each of the guide rods holding the springs under compression. The heads 29 are slidably fitted to the counterbores and so positioned that during slidable movement of the cap element 17 on the guide rods 25 they are in closing relation to the counterbores shielding the guide rods and the springs from damage.

The operating lever 12 is bifurcated providing a pair of legs 32. Axially aligned pins 33 pivotally mount the legs on opposite sides of the base element 16. The legs are interconnected by a shielding handle 34 fitted about the shank 21 and a portion of the cable 13 connected thereto. The handle preferably provides laterally extended edges 35 at each side of the shank for grasping convenience. A boss 36 is formed in the clamping member in a position engageable with a side of the shank 21 releasably to hold the lever when the handle portion thereof is fitted over the shank. The boss is an optional expedient. Frictional engagement between the lever and the shank may be relied upon dependably to hold the lever in position or the coaction of the cap element 17 and a cam 37, now to be described, may likewise accomplish the purpose.

The cam 37 is formed on each of the legs eccentrically of the pins 33 in engagement with the shoulders 24 of the cap element 17. Each of the cams has a portion of minimum radius relative to its respective pin 33 engageable with its shoulder when the lever is fitted over the shank, as constrained by the boss 36 in shank engagement.

The lever 12 is pivotal between its position with the handle 34 thereof fitted over the shank, as shown in Fig. 1, and an outwardly extended position as shown in Fig. 6. As the lever is pivoted from its releasably locked position to its outwardly extended position, portions of the cam 37 of progressively increased radius are slidably engaged with the shoulders 24 thrusting the cap element 17 outwardly on the guide rods 25 relative to the base element 16. Flats 38 are provided on the cams 37 in a common plane engageable with the shoulders 24 when the lever is pivoted to outwardly extended position so that as the shoulders are urged against the flats, the lever is releasably held in outwardly extended position.

Operation

The operation of the battery connector of the present invention is believed to be clearly apparent and is briefly summarized at this point. To mount the connector on the post 20 of the battery, the lever 12 is moved into its outwardly extended position with the cap element 17 thrust outwardly from the base element 16 and the lever held in outwardly extended position by engagement of the flats 38 with the shoulders 24. The handle 34 is conveniently grasped and the clamping members 11 slid downwardly over the post.

When positioned on the battery post 20, the handle 34 is pivoted against the shank 21 with the handle overlaying the juncture of the shank and the cable 13. The handle thus shields the connection and has been found to minimize cable breaking incident to repeated flexing at the point of juncture with the connector, as is well known in conventional battery connectors.

As the lever 12 is pivoted into its releasably locked position against the shank with the boss in shank engagement, the springs 28 urge the cap element 17 toward the base element. The springs are of such strength that a firm grasp is obtained on the battery post thus engaged. The opening defined by the base element and cap element is preferably smaller than a battery post to be engaged so that the connector of the present invention is mounted thereon, the base element and cap element are in slightly spaced adjacent relation. The vibration and wear which frequently serves to loosen conventional battery connectors serves further to fit the connector of the present invention more dependably on the post so that increased electrical conduction between the post and connector is attained incident to wear. The teeth provided on the inner end 19 of the cap element 17 tend to embed themselves into battery posts gripped between the elements.

When it is desired to disconnect the connector from a battery post, the lever 12 is simply moved to its outwardly extended position forcibly thrusting the cap element 17 from the base element 16 subsequent to which the connector is readily lifted from the post.

The battery connector of the present invention is economical to form from any suitable materials such as brass, copper, various alloys having high electrical conductivity and the like. It is of durable form and substantially reduces the time and inconvenience incident to the connection and disconnection of batteries.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention what I claim as new and desire to secure by Letters Patent is:

1. A battery connector comprising a gripping member including a base element having a substantially cylindrical shank extended therefrom, and a cap element, said base element and cap element defining a battery post receiving opening therebetween and the cap element being laterally extended on opposite sides of the base element providing a pair of shoulders disposed toward the base element; a battery cable connected to the shank of the base element and endwardly extended therefrom; a pair of guide rods mounted in parallel relation on the base element and extended therefrom on opposite sides of the post opening, the cap element having bores formed therein slidably receiving the guides and being provided with counterbores concentrically aligned with the bores and oppositely disposed in the cap element from the base element, the slidable association of the cap element on the guide rods constraining the cap element to rectilinear movement toward and from the base element in a plane common to the base element and normal to the axis of the post receiving opening; helical compression springs mounted on the guide rods in the counterbores; heads integral with the extended ends of the guides slidably fitted to the counterbores of the base element, retaining the compression springs in the counterbores under compression, the heads by said slidable fit substantially sealing the counterbores against the admission of foreign substances thereto and to the guides and the springs contained therein; a bifurcated lever having a pair of legs pivotally mounted on opposite sides of the base element adjacent to the cap element and providing a handle fitted against the shank; and cams integral with the legs of the lever eccentric to the pivotal mounting thereof having portions of minimum radii engaged with the shoulders of the cap element when the handle of the lever is fitted over the shank and adjacent portions successively engageable with the shoulders upon pivotal movement of the handle away from the shank of progressively increased radii.

2. A battery connector comprising a base element; a cap element, said base element and cap element defining a battery post receiving opening therebetween and having substantially parallel aligned bores therein on opposite sides of the post opening and the cap element having a counterbore therein concentrically aligned with each of the bores and oppositely disposed in the cap element from the base element; guide rods slidably extended through the bores of the cap element and rigidly mounted in the base element, said guide rods constraining the cap element to rectilinear movement toward and from the base element in a plane common to the base element and normal to the axis of the post receiving opening; heads integral with the ends of the guide rods slidably fitted to the counterbores in the cap element to resist the admission of foreign material to the counterbores; and helical compression springs mounted on the guide rods under compression between the heads and the cap element at the inner ends of their respective counterbores.

References Cited in the file of this patent

UNITED STATES PATENTS

| | | |
|---|---|---|
| 1,359,324 | Bullock | Nov. 16, 1920 |
| 1,677,445 | Hardos | July 17, 1928 |
| 2,185,419 | Packard | Jan. 2, 1940 |
| 2,194,138 | Crawford | Mar. 19, 1940 |
| 2,470,104 | Martin | May 17, 1949 |
| 2,548,782 | Goodnight | Apr. 10, 1951 |

FOREIGN PATENTS

| | | |
|---|---|---|
| 720,449 | France | Dec. 3, 1931 |